(12) United States Patent
O'Toole et al.

(10) Patent No.: US 8,494,350 B2
(45) Date of Patent: *Jul. 23, 2013

(54) FORCED AIR HEATER INCLUDING ON-BOARD SOURCE OF ELECTRIC ENERGY

(75) Inventors: Dennis O'Toole, Rocky River, OH (US); Brian S. Vandrak, Highland Heights, OH (US)

(73) Assignee: Enerco Group, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,713

(22) Filed: Jul. 14, 2011

(65) Prior Publication Data

US 2011/0268429 A1    Nov. 3, 2011

Related U.S. Application Data

(63) Continuation of application No. 11/954,704, filed on Dec. 12, 2007, now Pat. No. 8,068,724.

(60) Provisional application No. 60/874,427, filed on Dec. 12, 2006.

(51) Int. Cl.
    *F24D 15/02*    (2006.01)
(52) U.S. Cl.
    USPC ......... 392/365; 392/360; 392/373; 126/110 B
(58) Field of Classification Search
    USPC .................................................. 392/347–378
    See application file for complete search history.

(56) References Cited

U.S. PATENT DOCUMENTS

| | | | | | |
|---|---|---|---|---|---|
| 2,396,657 | A | * | 3/1946 | Holthouse | 126/93 |
| 2,498,362 | A | * | 2/1950 | De Lancey | 126/110 R |
| 4,201,544 | A | * | 5/1980 | Briggs et al. | 432/222 |
| 4,313,417 | A | * | 2/1982 | Briggs et al. | 126/110 B |
| 4,340,362 | A | * | 7/1982 | Chalupsky et al. | 432/222 |
| 4,443,187 | A | * | 4/1984 | Shaftner et al. | 432/222 |
| 4,850,853 | A | * | 7/1989 | Gruber et al. | 431/90 |
| 5,012,070 | A | * | 4/1991 | Reed | 219/202 |
| 5,014,371 | A | * | 5/1991 | Heel | 4/516 |
| 5,052,367 | A | * | 10/1991 | Beavers et al. | 126/110 B |
| 5,115,116 | A | * | 5/1992 | Reed | 219/202 |
| D330,756 | S | * | 11/1992 | Davies et al. | D23/338 |

(Continued)

FOREIGN PATENT DOCUMENTS

DE    19821830 A1    11/1998
EP    1085275 A2    3/2001

(Continued)

OTHER PUBLICATIONS

Theory of Operation, webpages from www.desatech.com.

(Continued)

*Primary Examiner* — Thor Campbell
(74) *Attorney, Agent, or Firm* — Brouse McDowell; Heather M. Barnes; Michael G. Craig

(57) ABSTRACT

A forced-air heater having a self-contained on-board electric-power supply that allows the forced-air heater to operate without an external electric power source; a fuel tank; a combustion chamber; a support; a housing including upper and lower housing portions; a motorized fan that during operation draws in ambient air through an air intake and forces air into the combustion chamber.

15 Claims, 6 Drawing Sheets

U.S. PATENT DOCUMENTS

| | | | | |
|---|---|---|---|---|
| 5,183,998 | A | * | 2/1993 | Hoffman et al. ............... 219/492 |
| 5,337,729 | A | | 8/1994 | Oman |
| 5,509,604 | A | | 4/1996 | Chung |
| 5,533,892 | A | * | 7/1996 | Long .............................. 431/264 |
| 5,540,213 | A | * | 7/1996 | Shell et al. ................. 126/110 B |
| 5,848,585 | A | * | 12/1998 | Long et al. ................. 126/110 B |
| 6,142,141 | A | * | 11/2000 | Long .......................... 126/110 B |
| 6,277,522 | B1 | * | 8/2001 | Omaru et al. ............... 429/231.8 |
| 6,340,298 | B1 | * | 1/2002 | Vandrak et al. ............... 432/222 |
| 6,648,635 | B2 | * | 11/2003 | Vandrak et al. ............... 432/222 |
| 6,843,244 | B2 | * | 1/2005 | McCalley et al. ........... 126/92 R |
| 6,884,065 | B2 | * | 4/2005 | Vandrak et al. ............... 432/222 |
| 7,300,278 | B2 | * | 11/2007 | Vandrak et al. ............... 432/222 |
| 7,600,998 | B1 | * | 10/2009 | Pitchford et al. ............. 432/222 |
| 7,719,143 | B2 | * | 5/2010 | Powell .......................... 307/147 |
| 7,741,815 | B2 | * | 6/2010 | Cassidy ........................ 320/152 |
| 8,068,724 | B2 | * | 11/2011 | Vandrak et al. ............... 392/365 |
| 8,146,583 | B1 | * | 4/2012 | Lee, Jr. ..................... 126/110 B |
| 2004/0106080 | A1 | * | 6/2004 | Vandrak et al. ............... 432/222 |
| 2005/0233219 | A1 | | 10/2005 | Gozdz et al. |
| 2005/0233220 | A1 | | 10/2005 | Gozdz et al. |
| 2005/0253560 | A1 | | 11/2005 | Popescu-Stanesti et al. |
| 2005/0257786 | A1 | * | 11/2005 | Vandrak et al. ............. 126/91 R |
| 2006/0245744 | A1 | * | 11/2006 | Ju ................................. 392/365 |
| 2008/0260364 | A1 | | 10/2008 | Vandrak et al. |
| 2011/0265779 | A1 | * | 11/2011 | Vandrak et al. ................. 126/93 |

FOREIGN PATENT DOCUMENTS

| | | |
|---|---|---|
| GB | 841285 A | 7/1960 |
| WO | 0005540 A1 | 2/2000 |
| WO | 02079700 A1 | 10/2002 |
| WO | 2007056202 A2 | 5/2007 |

OTHER PUBLICATIONS

PCT International Search Report and Written Opinion from International Application No. PCT/US2011/032263, mailed Jan. 17, 2013, 16 pages.

* cited by examiner

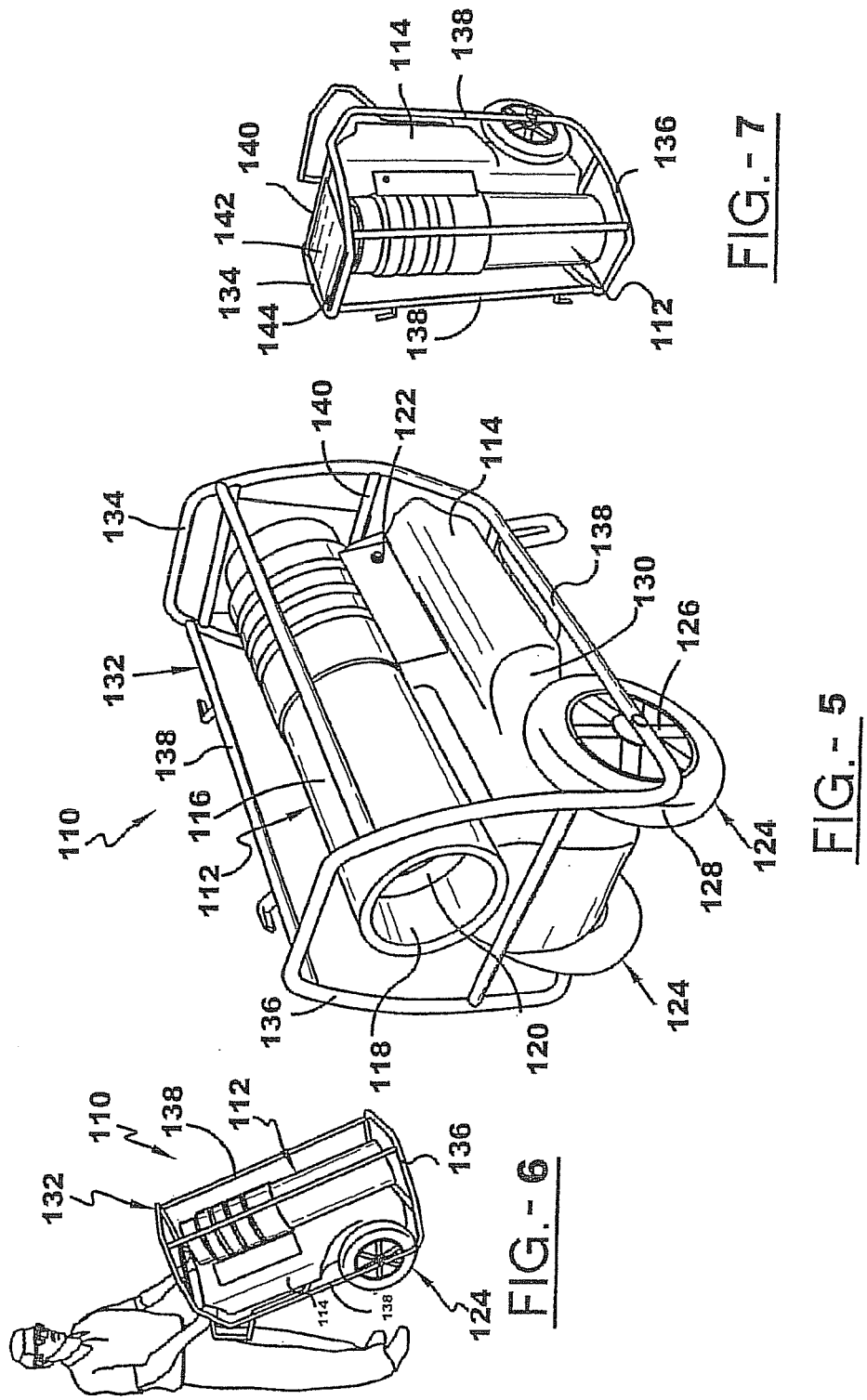

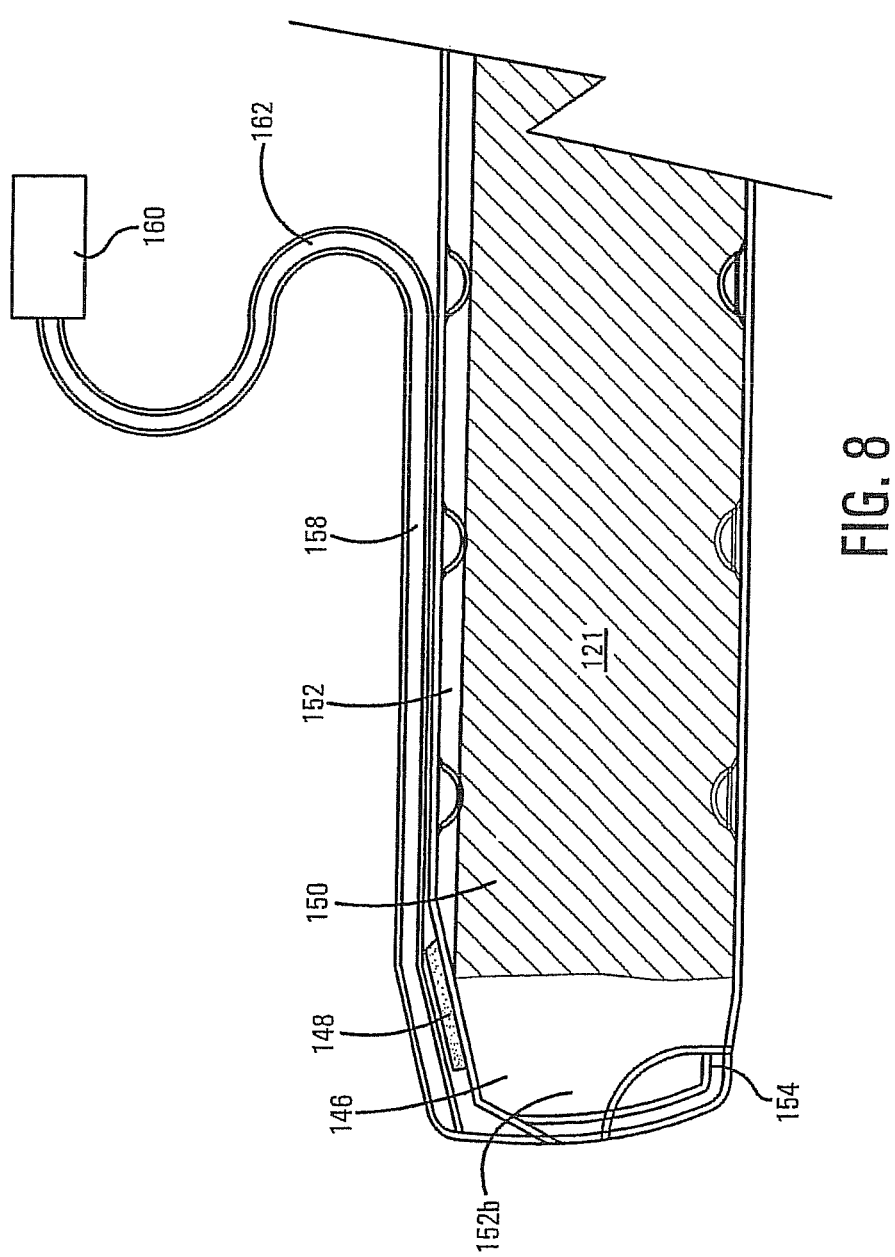

US 8,494,350 B2

FORCED AIR HEATER INCLUDING ON-BOARD SOURCE OF ELECTRIC ENERGY

CROSS-REFERENCE TO RELATED APPLICATIONS

This application is a continuation of U.S. application Ser. No. 11/954,704, filed Dec. 12, 2007, which claims the benefit of U.S. Provisional Application No. 60/874,427, filed Dec. 12, 2006. All of the subject matter disclosed by U.S. Ser. No. 60/874,427 is hereby incorporated by reference into this application. All of the subject matter disclosed by U.S. Ser. No. 11/954,704 is hereby incorporated by reference into this application.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates generally to portable forced-air heaters, and more particularly to portable forced-air heaters that derive at least a portion of their electric energy required for operation of the heaters, or an accessory thereof, from an on board source.

2. Description of Related Art

Fuel-fired portable heaters such as forced-air heaters are well known in the art and find use in multiple environments. The heater typically includes a cylindrical housing with a combustion chamber disposed coaxially therein. A combustible liquid fuel from a fuel tank is atomized and mixed with air inside the combustion chamber where it is combusted, resulting in the generation of a flame. During combustion of the air/fuel mixture a fan blade is rotated by an electric motor to draw ambient air into the heater to be heated by the combustion of the air/fuel mixture. The heated air is expelled out of the heater by the continuous influx of air caused by the fan.

Traditionally, forced-air heaters have required a source of electric energy to energize the motor that rotates the fan blade and optionally to operate an ignition source that triggers combustion of the air/fuel mixture. The fan is often a heavy-duty, high output fan that consumes significant amounts of electric energy during operation thereof, and operation of the igniter consumes even more electric energy. The demand for electric energy created by operation of the fan and other electric components of forced-air heaters has required such heaters to be plugged into a conventional wall outlet supplying alternating current ("AC") electric energy generated by a public utility. In remote environments a lengthy extension cord can establish a conductive pathway for the electric energy between a wall outlet and the location of the forced-air heater. However, at locations where a new structure is being built a conventional wall outlet is typically not available, requiring the use of a portable generator to supply the electric energy until utility-generated electric energy becomes available.

As previously mentioned, forced-air heaters are often utilized to provide heat to new construction environments for significant periods of time that can extend well into the night. After dusk, illumination of the environment in the vicinity of the forced-air heater is required to enable workers to view their worksite and avoid potentially hazardous conditions. Assuming that a conventional wall outlet is available, an extension cord can be used to conduct electric energy from the wall outlet to an on-site light stand. However, the light stand adds to the equipment that must be transported to a jobsite, and a conventional wall outlet is usually not available during the initial stages of a new construction.

Even in instances when a conventional wall outlet is available, there are normally a limited number of electric devices that can be powered by the outlet at any given time. Using adaptors to increase the number of available outlets into which an electrical device can be plugged can lead to excessive currents being drawn through an extension cord or other adaptor. Thus, there are a limited number of electrical devices that can be simultaneously powered on a new construction jobsite at any given time. This limitation is even greater when a wall outlet supplying utility-generated electricity is unavailable.

Forced-air heaters are also relatively bulky, and occupy a significant amount of storage space while not in use. Attempts to store such a heater in an alternative orientation other than its intended operational orientation in which the heater is designed to be fired in order to conserve storage space results in the liquid fuel leaking out of the heater. And although the fuel can be drained from the heater before storing it in an alternative orientation to minimize the leakage of fuel, such an option is time consuming, and is impractical for temporary storage on a daily basis.

Accordingly, there is a need in the art for a forced air heater that is operational in a remote environment in the absence of a conventional wall outlet supplying utility-generated AC electric energy. At least one electrical component of the forced air heater can be energized during operation of the heater by electric energy from an on-board source of electric energy. The forced air heater can also optionally include an electric energy outlet that can provide an interface through which an electric accessory can be energized by electric energy from the on-board energy source. Further, the forced air heater can optionally also include a light source for illuminating an environment in the vicinity of the forced air heater. Further yet, the forced air heater can optionally include a fuel-management system that minimizes leakage of a liquid fuel from the heater while stored in an alternative orientation other than the orientation in which it is to be fired.

BRIEF SUMMARY OF THE INVENTION

A forced-air heater having a self-contained on-board electric-power supply that allows the forced-air heater to operate without an external electric power source; a fuel tank; a combustion chamber; a support; a housing including upper and lower housing portions; a motorized fan that during operation draws in ambient air through an air intake and forces air into the combustion chamber.

BRIEF DESCRIPTION OF THE DRAWINGS

The invention may take physical form in certain parts and arrangement of parts, embodiments of which will be described in detail in this specification and illustrated in the accompanying drawings which form a part hereof, and wherein:

FIG. 5 is a view of a forced-air heater in an orientation in which it is to be fired according to an embodiment of the present invention;

FIG. 6 is a view of a forced-air heater in an orientation in which it can optionally be transported with minimal leakage of a liquid fuel from the heater's fuel tank according to an embodiment of the present invention;

FIG. 7 is a view of a forced-air heater in a substantially-vertical orientation in which it can optionally be stored with minimal leakage of a liquid fuel from the heater's fuel tank according to an embodiment of the present invention; and FIG. 8 is a cutaway view of a fuel management system that can optionally be provided to a forced-air heater according to an embodiment of the present invention.

DETAILED DESCRIPTION OF THE INVENTION

Figure 1:
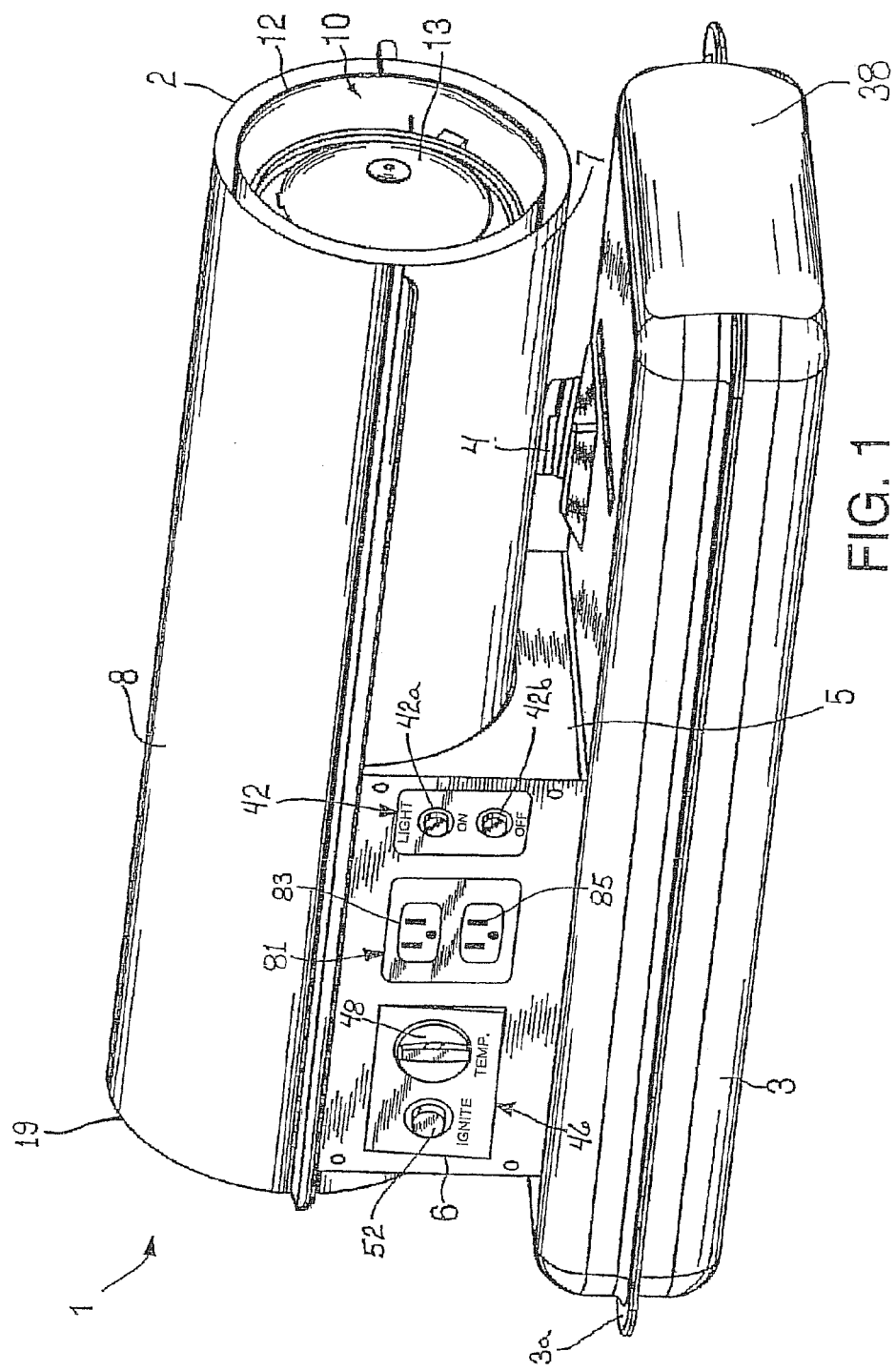
FIG. 1 is a perspective view of a forced-air heater including an outlet and a light exposed to an exterior of the forced-air heater in accordance with an embodiment of the present invention.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Figure 2:
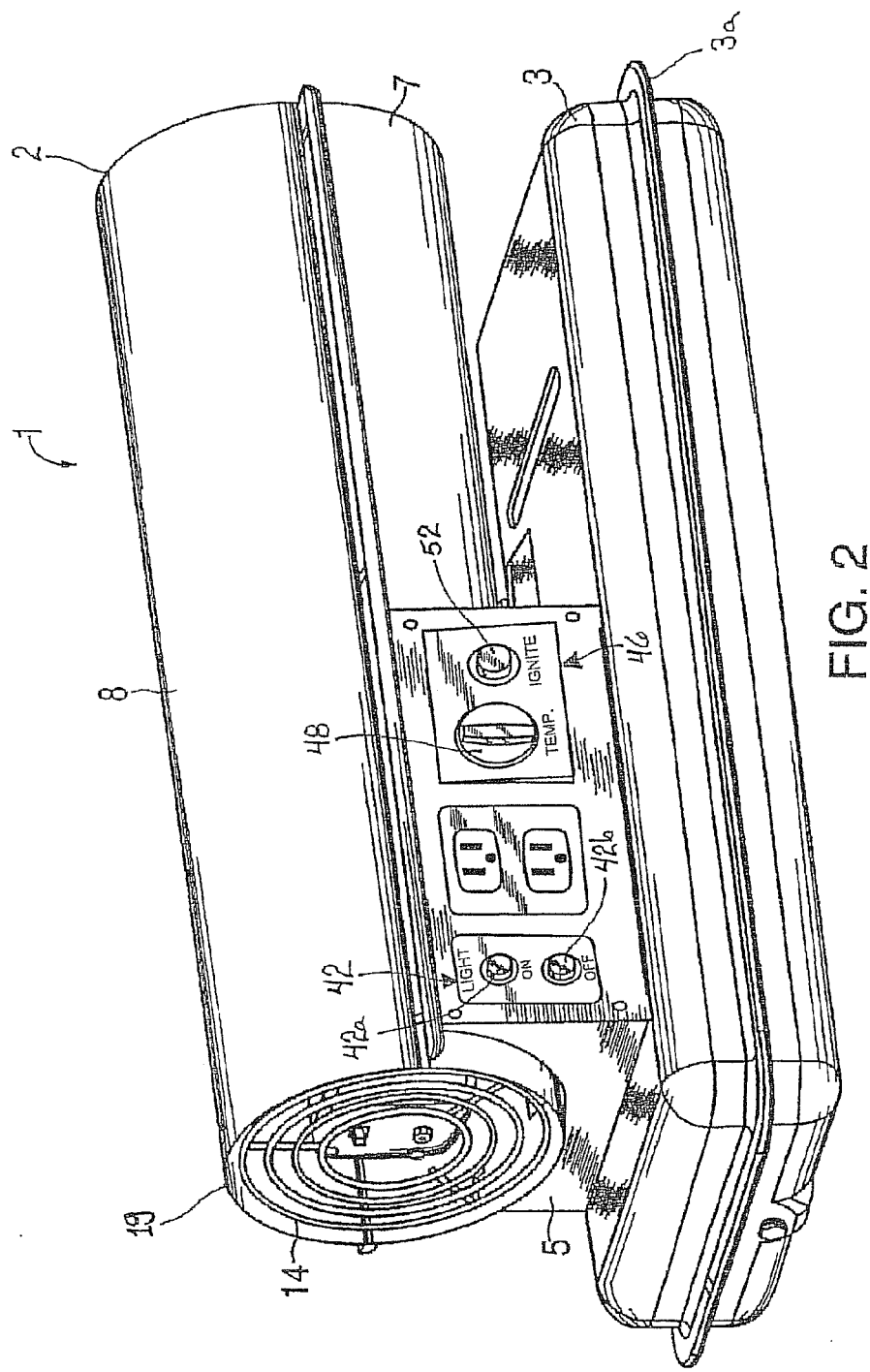
FIG. 2 is a perspective view of a forced-air heater including an outlet and a light exposed to an exterior of the forced-air heater in accordance with an embodiment of the present invention.

FIGS. 1 and 2 show illustrative embodiments of a forced-air heater 1, which generally includes a fuel tank 3, a support 5, a housing including upper and lower housing portions 8, 7, respectively, and a combustion chamber 10 including an inner cylinder 11 and an outer cylinder 12. Alternate embodiments include a housing formed as a singular, generally cylindrical shell. A semi-spherical shaped baffle 13 is provided adjacent to a discharge end 2 of the combustion chamber 10 and an intake guard 14 is provided adjacent to an air intake end 19 port of the forced-air heater 1.

The fuel tank 3 can optionally be formed as a singular molded unit or from two opposing rectangular trays arranged with their openings facing each other. For embodiments including a fuel tank 3 formed from two opposing trays, the trays are joined together by seam welding or otherwise coupling flanges 3a extending around the perimeter of the fuel tank 3. A removable filler cap 4 covers a fueling aperture (not shown) formed in a surface of the fuel tank 3 through which a liquid fuel 20 (FIG. 3) such as a suitable grade fuel oil, kerosene, gasoline and the like may be added. The liquid fuel is atomized and combined with air or other oxygen source in the combustion chamber 10, where it is combusted to generate the thermal energy for heating air being forced through the forced-air heater 1.

The combustion chamber 10 includes a cavity defined by a generally cylindrical shell 12. An annular space 71 (FIG. 3) is left between an outer surface of the shell 12 and the housing to reduce the amount of heat that is transferred therebetween from the amount of heat that would be so transferred if the outer surface of the shell 12 contacted the housing. The combustion chamber 10 is secured to the housing by a plurality of evenly spaced brackets disposed about the periphery of the combustion chamber's input and output. The brackets are secured by screws or the like to the shell 12 and to locations of the housing. One ore more brackets are also provided to couple the baffle 13 to the shell 12 defining the combustion chamber 10.

A light 38 can optionally be coupled to the heater 1 to illuminate an environment within the vicinity of the heater 1. The light 38 can be any conventional electric light including, but not limited to a fluorescent light, incandescent light, high-intensity light emitting diode ("LED") array, and the like. A clear or slightly opaque protective shroud or lens can optionally be provided to protect the light 38 from being damaged by other objects near the heater 1. Further, operation of the light 38 can be controlled by the operator with a switch 42 independent of the operation of the other components of the forced-air heater 1 and the combustion of fuel from the fuel tank 3. The switch 42 can be any type of operator input device, such as a multi-position switch, one or more push button switches (as shown in FIGS. 1 and 2), and the like. In FIGS. 1 and 2, the switch 42 includes an ON pushbutton switch 42a and an OFF pushbutton switch 42b, which turn the light 38 on and off, respectively. According to alternate embodiments, the switch 42 can optionally offer a plurality of intensity settings, such as low, medium and high, or can be controlled with an infinitely adjustable dimmer switch to control the intensity of the light 42.

A heater control panel 46 is operatively coupled to the heater 1 to allow the operator to control heating of the ambient environment by the heater 1. The control panel 46 in the illustrative embodiments shown in FIGS. 1 and 2 include a thermostat interface 48 and an ignition switch 52. The thermostat interface 48 can be rotated about a central axis to a desired temperature to which the operator wishes to heat the ambient environment of the heater 1. The thermostat interface 48 can be infinitely adjusted between high and low temperature limits, or can be rotated to one or more predetermined temperature settings such as LOW, MEDIUM and HIGH. The temperature selected with the thermostat interface 48 can govern operation of an electric motor 15 discussed below, ignition of an air/fuel mixture, the supply of fuel to the combustion chamber 10, the ratio of air to fuel provided to the combustion chamber 10, an igniter 56 discussed below with reference to FIG. 3, or any combination thereof. As is known in the art, a thermostat operatively coupled to the thermostat interface 48 controls activation, deactivation, and operation of any of these components to maintain the temperature within the ambient environment of the heater 1 at approximately the temperature selected with the thermostat interface 48.

The support 5 is secured to or otherwise formed adjacent to the top surface of the fuel tank 3 by spot welding, brazing, or the like, and supports the heater's housing. The support 5 includes at least one adjustable panel 6 that can be adjusted by an operator to gain access into an interior chamber 21 defined by the support 5. The adjustable panel 6 can be secured to the support 5 by any type of fastener that permits adjustment of the adjustable panel 6 to allow access into the interior chamber 21. Examples of such fasteners include a hinge, locking screw, latch, and the like. The interior chamber can house components of the forced-air heater 1, such as a self-contained, on-board power supply 24 (FIG. 3), control and ignition circuitry, electrical wiring, air and fuel hoses, and the like. Each of such components can be serviced, replaced or accessed through the aperture in the support 5 concealed by the adjustable panel 6 is removable to provide convenient access to the components housed in the compartment for servicing and replacement.

The self-contained, on-board power supply 24 can be any type of portable energy source that can supply electric energy, at least temporarily, when utility-generated electric energy is unavailable. Examples of suitable on-board power supplies 24 include, but are not limited to, a battery, thermoelectric generator, fuel cell, ultracapacitor, and the like. An example of a suitable battery is the lithium secondary cell battery (also called a lithium ion battery), a cutaway view of which is shown schematically in FIG. 4. Details of such a battery are disclosed in United States Patent Publication No. US 2005/ 0233219, published on Oct. 20, 2005, which is incorporated in its entirety herein by reference. Another example of a suitable battery 24 is described in detail in United States Publication No. US 2005/0233220, published on Oct. 20, 2005, which is also incorporated in its entirety herein by reference. This, or batteries with similar performance characteristics may be utilized to supply electric energy, at least temporarily, to one or more electric components of the forced-air heater 1.

The aforementioned lithium ion examples of a suitable battery that can be used as the power source 24 of the present invention include a high-capacity lithium-containing positive electrode in electronic contact with a positive electrode current collector. A high-capacity negative electrode is in electronic contact with a negative electrode collector. The positive and negative collectors are in electrical contact with separate external circuits. A separator is positioned in ionic contact between with the cathode (positive terminal) and the anode (negative terminal), and an electrolyte is in ionic contact with the positive and negative electrodes. The slow discharge rates of the battery allow for extended shelf-life and extended use characteristics.

The total and relative area specific impedances for the positive and negative electrodes of such exemplary batteries 24 are such that the negative electrode potential is above the potential of metallic lithium during charging at greater than or equal to 4C (4 times the rated capacity of the battery per hour). The current capacity per unit area of the positive and negative electrodes each are at least 3 mA-h/cm2 and the total area specific impedance for the cell is less than about 20 $\Omega$-cm2. The ratio of the area specific impedances of the positive electrode to the negative electrode is at least about ten.

Also, for the lithium ion batteries 24 discussed in the examples above, the area specific impedance of the total cell is localized predominantly at the positive electrode. The charge capacity per unit area of the positive and negative electrodes each are preferably at least 0.75 mA-h/cm2, more preferably at least 1.0 mA-h/cm2, and most preferably at least 1.5 mA-h/cm2. The total area specific impedance for the cell is less than about 16 $\Omega$-cm2, preferably less than about 14 $\Omega$-cm2, and more preferably less than about 12 $\Omega$-cm2, more preferably less than about 10 $\Omega$-cm2, and most preferably less than or equal to about 3 $\Omega$-cm2. The negative electrode has an area specific impedance of less than or equal to about 2.5 $\Omega$-cm2, more preferably less than or equal to about 2.0 $\Omega$-cm2, and most preferably less than or equal to about 1.5 $\Omega$-cm2.

Examples of suitable materials for the positive electrode include a lithium transition metal phosphate including one or more of vanadium, chromium, manganese, iron, cobalt, and nickel. Examples of suitable negative electrode materials include carbon, such as graphitic carbon. The carbon is selected from the group consisting of graphite, spheroidal graphite, mesocarbon microbeads and carbon fibers.

Figure 4:
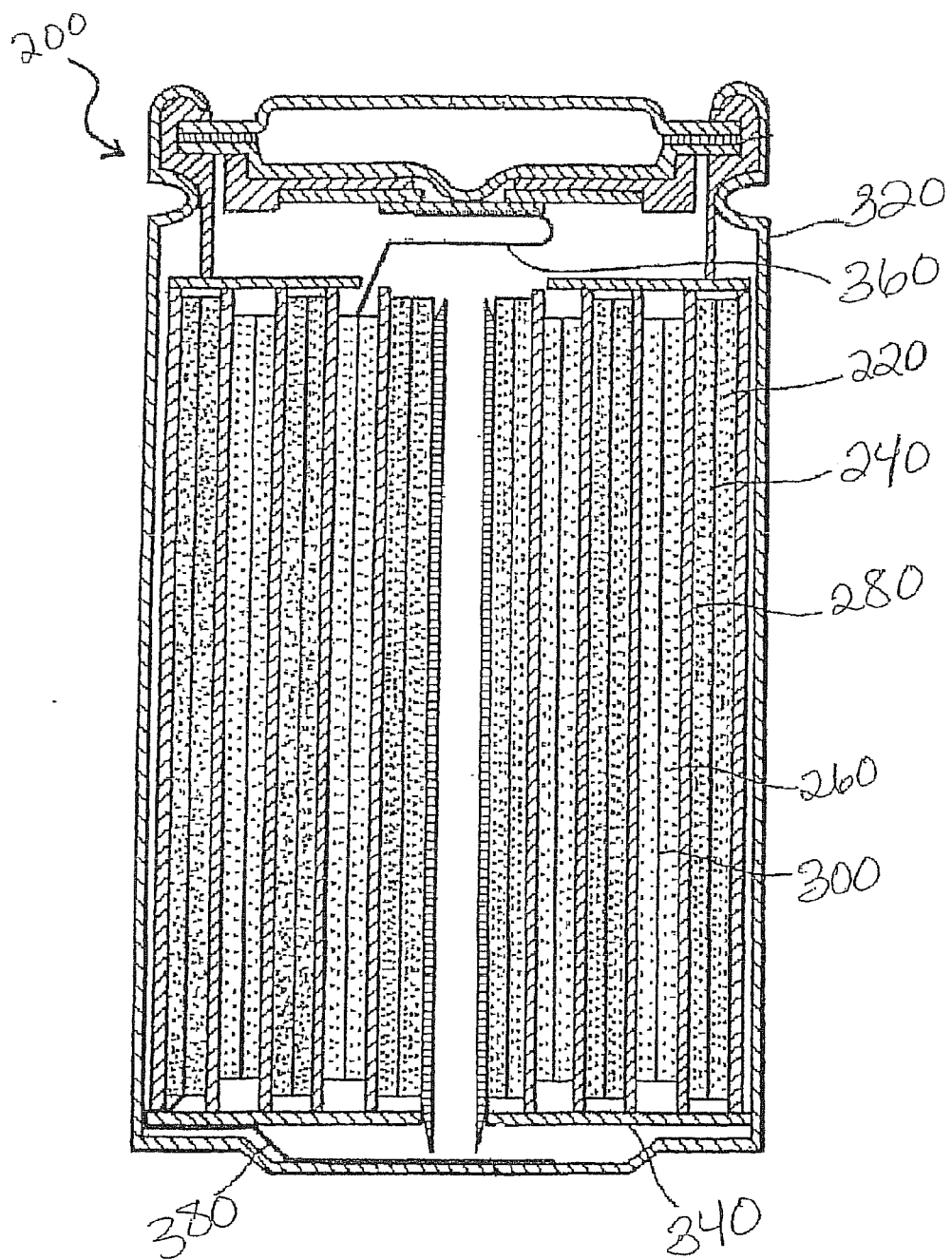
FIG. 4 is a cutaway view of a battery that can optionally be utilized as a power source for a forced-air heater in accordance with the present invention.

Embodiments of the battery 24 can optionally include a battery element having an elongated cathode and an elongated anode, which are separated by two layers of an elongated microporous separator which are tightly wound together and placed in a battery can. An example of a typical spiral electrode secondary cell is shown in FIG. 4, the details of which are discussed in U.S. Patent Publication 2005/ 0233219 and U.S. Pat. No. 6,277,522, both of which are incorporated in their entirety herein by reference. The secondary cell 200 includes a double layer of anode material 220 coated onto both sides of an anode collector 240, a separator 260 and a double layer of cathode material 280 coated onto both sides of cathode collector 300 that have been stacked in this order and wound to make a spiral form. The spirally wound cell is inserted into a battery can 320 and insulating plates 340 are disposed at upper and lower surfaces of the spirally wound cell. A cathode lead 360 from anode collector 300 provides electrical contact with the cover. An anode lead 380 is connected to the battery can 320. An electrolytic solution is also added to the can.

Figure 3:
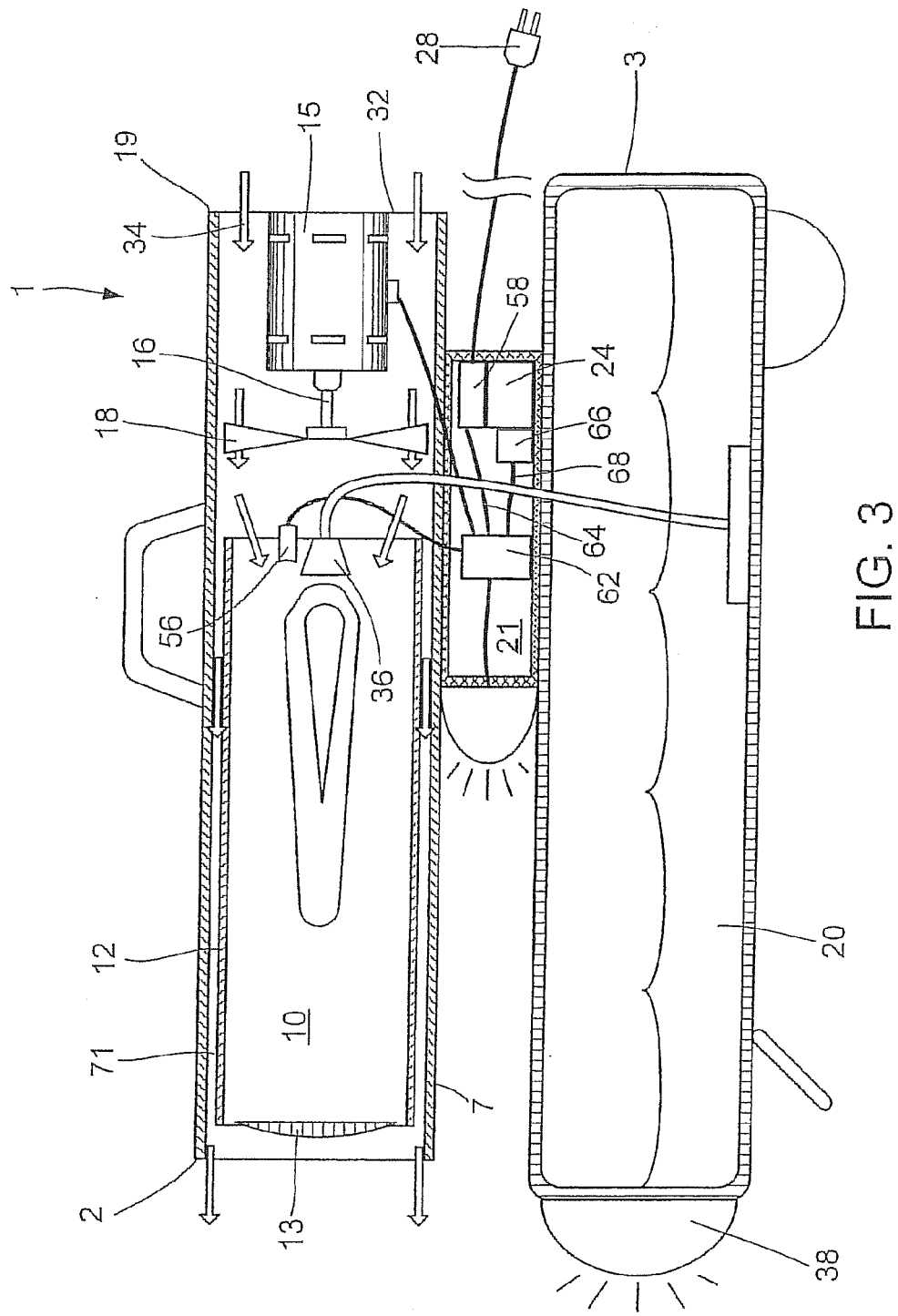
FIG. 3 is a cutaway view of a forced-air heater in accordance with an embodiment of the present invention.

FIG. 3 is a cutaway view of a forced-air heater 1 in accordance with an embodiment of the present invention. Adjacent to the intake end 19 of the forced-air heater 1, a motor 15 is supported by means of a bracket 32 that extends between the lower and upper housing portions 7,8. A drive shaft 16 extends from and is rotationally driven by the motor 15. An end of the drive shaft 16 is coupled to fan blades 18, which draw ambient air in the direction of arrows 34 through the air intake end 19 of the forced-air heater 1. The fan blades 18 force air into the combustion chamber 10, where it is mixed with the atomized fuel injected into the combustion chamber 10 through the nozzle 36 and the mixture is combusted. The intake guard 14 at the intake port prevents large objects, which can damage the fan blades 18 or block the air passages, from entering the forced-air heater 1.

The battery or other type of power supply 24 can supply electric energy, at least temporarily, to operate one or more electric components of the heater 1 while the heater 1 is generating thermal energy for heating its ambient environment. Electric energy can be supplied by the power source 24 to a control unit 62 via an electrical conductor 64 disposed within the internal chamber 21 of the support 5. The control unit 62 is operatively coupled to the user interface devices provided to the heater 1 such as the switch 42, control panel 46, any other user input device, or any combination thereof to carry out control commands input by an operator. The control unit includes necessary electrical and electronic hardware, software, or a combination thereof chosen with sound engineering judgment to respond to commands input by an operator via one or more user interface devices provided to the heater 1.

The heater 1 can be equipped with a rectifier 58 that converts alternating current ("AC") electric energy from an external source conducted via a plug 28 into DC electric energy. The rectifier 58 is operatively coupled to the power supply 24 and the control unit 62 to distribute DC electric energy as needed for proper operation of the heater 1. DC electric energy can be selectively supplied by the rectifier 58 to the control unit 62, to recharge the battery or other power source 24, or simultaneously to the control unit 62 and the power source 24 when electric energy from an external source such as a conventional wall outlet or generator is available. Thus, when AC electric energy is available from an external source, the AC electric energy is rectified by the rectifier 58 into DC electric energy. If the power source 24 is charged to a degree that is less than a predetermined lower limit such as 90%, the rectifier can automatically (i.e., without operator intervention) supply DC electric energy for charging the power source 24 until a predetermined cutoff condition is met. Simultaneously, the rectifier 58 can supply DC electric energy to the control unit 62 during operation of the heater 1. In turn, the control unit 62 selectively establishes conductive pathways between one or more electric components, such as an igniter 56, light 38, fuel pump (not shown), and motor 15 for example, to energize the appropriate component(s) in response to control commands input by the operator via switch, 42, control panel 46 and the like.

Other embodiments of the present invention utilize the air forced into the combustion chamber 10 by the fan blades 18 to draw fuel from the fuel tank 3 into the combustion chamber 10. According to these embodiments, the air is directed passed the nozzle 36, thereby creating a vacuum force that draws the fuel from the fuel tank 3 and directs it into the combustion chamber 10.

When AC electric energy from an external source is unavailable, the rectifier 58 can conduct DC electric energy from the power source 24 via a conductive pathway 64 to the control unit 62. Since rectification of the DC electric energy from the power source 24 is not needed if DC electric energy is demanded, the rectifier 58 can merely establish the conductive pathway 64 leading to the control unit. In response to a control command input by the operator, the control unit 62 can selectively establish and break conductive pathways corresponding to the control command to activate and deactivate the appropriate electric component(s) of the heater 1.

Alternate embodiments of the heater 1 can optionally include a motor 15 or other electric component that is designed to be energized by AC electric energy. For such embodiments, if the power source 24 is a battery or other DC source of electric energy, the heater 1 can further include an inverter 66 to convert the DC electric energy from the power source 24 into AC electric energy to be utilized by the motor 15 or other component. When an external source of AC electric energy such as a wall outlet or generator is available, the rectifier 58 can conduct the AC electric energy via a conductive pathway to the control unit 62 without rectifying it into DC electric energy. Thus, the AC electric energy conducted by the plug 28 from the external source is conducted to the control unit 62 as AC electric energy for use in energizing one or more AC electric components corresponding to a control command input by the operator via switch 42, control panel 46, and the like. Additionally, if an external source of AC electric energy is available, the rectifier 58 can simultaneously rectify the AC electric energy into DC electric energy for charging the battery or other such power source 24.

If the heater 1 includes one or more electric components to be energized with AC electric energy and such electric energy is not available from an external source of AC electric energy, the inverter 66 converts DC electric energy from the power source 24 into AC electric energy. This inverted AC electric energy is conducted by a conductive pathway 68 to the control unit 62, which establishes one or more conductive pathways to the component(s) to be energized with AC electric energy corresponding to the control command input via switch 42, control panel 46, and the like.

The embodiment of the heater 1 shown in FIGS. 1 and 2 further includes an optional electric energy outlet 81 into which external electric accessories such as radios, clocks, power tools and the like can be plugged. The outlet 81 includes one or more female receptacles 83 that can receive conventional two-prong electric power cord plugs. Accordingly, each receptacle 83 includes at least two apertures 85 into which the prongs of the plug provided to the external electric accessory are inserted to establish an electrical connection between the heater 1 and the external electric accessory.

The outlet 81 can act as a source of AC electric energy to energize the external electric accessory when a conventional wall outlet or generator is not available. The outlet 81 can also act as an extension of a conventional wall outlet or generator when such an external source of AC electric energy is available.

When an external source of AC electric energy is unavailable, the inverter 66 can convert DC electric energy from the power source 24 into AC electric energy. The AC electric energy output by the inverter 66 can be in the form of a sinusoid having a peak in the form of a with a peak voltage of about 170 volts and a frequency of about 60 Hz, similar to the AC electric energy sourced by a conventional wall outlet. However, it should be noted that the AC electric energy output by the inverter 66 can deviate from a perfect sinusoid, and in fact, can take on the shape of a square wave, triangular waveform, and any other waveform shape suitable for energizing an external electric accessory. Due to the large power output capacity of a battery, such as the lithium ion battery described above, some of which can output up to 3000 Watts, the external electric accessory can be energized by AC electric energy converted from DC electric energy supplied by the battery or other power source 24.

When an external source of AC electric energy is available to the heater 1, the rectifier 58 can conduct the AC electric from the external source to the control unit 62. The control unit 62 is operatively connected to the one or more electrical outlets 81 to establish a conductive path there between. Thus, in addition to controlling the flow of any AC electric energy required to energize one or more components of the heater 1, the control unit 62 can also direct the AC electric energy to the outlet 81. Even when the heater 1 is not combusting the air/fuel mixture to deliver thermal energy to the ambient environment of the heater 1, the outlet 81 can still be utilized by an external electric accessory. This is true regardless of whether the AC electric energy is converted from DC electric energy from the power source 24 or supplied from a conventional wall outlet, generator or the like through the heater's plug 28.

Thus, the power source 24 provided to the heater 1 can selectively supply electric energy, AC, DC, or any combination thereof to one or more of the following electric components of the heater 1: an igniter such as a hot surface igniter, spark ignitor, and the like; a fan; a blower; one or more AC electric outlets 81; one or more lights 38; a thermostat; and any combination thereof. Further, the power source 24 can supply this electric energy simultaneously while combustion of the combustible fuel is taking place, or in the absence of the combustion of the combustible fuel. And the electric energy supplied by the power source 24 can be supplied at least temporarily in the absence of an external source of electric energy, simultaneously with the supply of electric energy from an external source, or as a backup power supply.

An alternate embodiment of a forced-air heater 110 according to the present invention is shown in FIG. 5. The embodiment in FIG. 5, in combination with one or more of the features discussed above, can optionally further include a chassis that facilitates mobility of the heater 110, and the ability to be stored in a substantially-vertical orientation with only minimal, if any, leakage of the liquid fuel from the fuel tank 114. One or more wheels 124 can optionally be provided to facilitate transportation of the forced-air heater 110. Each wheel 124 can include a rim 126 provided with a rubberized exterior coating 128 about its exterior periphery. According to an embodiment of the forced-air heater 110, the fuel tank 114 includes a generally-cylindrical passage formed in the housing through which an axle extends to support the wheels 124. Each wheel 124 can also optionally be positioned within a wheel well 130 formed in the fuel tank 114. The wheel wells 130 allow the wheels 124 to be recessed inwardly toward the center of a fuel tank 114 thereby giving the forced-air 110 a generally-streamlined configuration.

A frame 132 fabricated from an arrangement of tubes or rods made from a metal or other suitably-strong material for supporting the weight of a fully fueled forced-air heater 110 forms a cage that at least partially encases the heating conduit 112 and fuel tank 114. The frame 132 includes a proximate end 134 and a distal end 136 separated by longitudinally extending members 138. A cross member 140 can serve as a handle at the proximate end 134, allowing the operator to grasp the forced-air heater 110 and maneuver it as desired. A member 138' can extend longitudinally along each side of the forced-air heater 110 adjacent to the fuel tank 114 and externally of the wheels 124. In this arrangement, the member 138' allows for simplified installation of the wheels 124 and the frame 132, and also protects the wheels 124 from impacting nearby objects while the forced-air heater 110 is being maneuvered.

FIG. 6 illustrates transportation of the forced-air heater 110 in a somewhat vertical orientation according to an embodiment of the present invention. The orientation of the forced-air heater 110 shown in FIG. 6 is but one of the possible orientations in which the forced-air heater 110 can be oriented without leaking significant amounts of liquid fuel from the fuel tank 114. This orientation is an example of what is meant herein by references to an orientation other than the orientation in which the forced-air heater 110 is intended to be fired, which is the orientation shown in FIG. 5.

FIG. 7 illustrates an embodiment of a forced-air heater 110 in a substantially-vertical storage orientation. When not in use, the forced-air heater 110 can be stood on the distal end 136 of the frame 132. The tubing made from a metal or other strong material that forms the distal end 136 of the frame 132 is patterned to give the distal end 136 a suitably-wide footprint that can maintain the forced-air heater 110 in the substantially vertical orientation shown in FIG. 3. The footprint of the distal end 136 can optionally be large enough to maintain the substantially-vertical orientation of the forced-air heater 110 even when minor forces are imparted on the forced-air heater 110 above the distal end 136 with reference to FIG. 7.

While the forced-air heater 110 is in the substantially-vertical storage orientation, a rain shield 142 is positioned to interfere with the entry of falling objects or other debris into the heating conduit 112. The rain shield 142 can be a planar sheet of metal or other rigid material that extends between the cross member 140 that serves as the handle and a second cross member 144. With the rain shield 142 positioned as shown in FIG. 7, it interferes with the entry of falling objects into the end of the heating conduit 112 in which air is drawn from the ambient environment.

The forced-air heater 110 has been described thus far and illustrated in the drawings as optionally including a rain shield 142 adjacent to the ambient air intake end of the heating conduit 112. However, it is to be noted that the present invention is not limited solely to such an arrangement. Instead, the present invention also encompasses a forced-air heater 110 that can be stored in a substantially-vertical orientation such that the discharge end of the heating conduit 112 from which heated air is forced is aimed upwardly, and the ambient air intake end is aimed toward the ground. Of course, the fuel-management system of the present invention described below will be adapted accordingly.

FIG. 8 is a cross-section view of an embodiment of a fuel tank 114, which forms a portion of the combustion heater's fuel-management system. The fuel tank 114 includes one or more cavities 146 that alternately accommodates liquid fuel and an air gap that is shifted when the forced-air heater 110 is transitioned from its firing orientation (shown in FIG. 5) to its substantially-vertical storage orientation (shown in FIG. 7), and vice versa. A fuel outlet 154 is provided adjacent to the lowermost portion of the fuel tank 114 while the forced-air heater 110 is in its horizontal firing position. Positioning the fuel outlet 154 in this manner allows approximately all of the fuel to be removed from the fuel tank 14 during operation of the forced-air heater 110.

A hose 158 is connected between the fuel outlet 154 and a nozzle 160 through which the fuel is metered into the combustion chamber 120. The hose 158 can be fabricated from any material that will resist damage and degradation from exposure to the particular fuel used to fire the forced-air heater 110. Examples of the types of fuels the hose 158 will transport include, but are not limited to, kerosene, diesel fuel oil, and the like.

The hose 158 includes an arcuate portion 162, which is also referred to herein as a return curve 162. The return curve 162 is positioned on the forced-air heater 110 such that the return curve 162 is oriented similar to a "U" while the forced-air heater 110 is in its substantially-vertical storage orientation, with both arms aimed upwardly in a direction generally opposing the acceleration of gravity.

The location of the fuel inlet 148 through which liquid fuel can be inserted into the fuel tank 114 limits the amount of fuel that can be placed in the fuel tank 114. With the forced-air heater 110 in its firing orientation, the lowest point of the fuel inlet 148 marks the upper fuel level limit 150. Thus, the air gap 152a is disposed above the upper fuel level limit 50 and the liquid fuel in the fuel tank 14. When the forced-air heater 110 is transitioned to the substantially-vertical storage orientation shown in FIG. 3, the fuel in the fuel tank 114 shifts to position an air gap 152b adjacent to the fuel outlet 154. An example of a suitable size for the air gaps 152a, 152b is about 0.4 gallons with the fuel tank 114 at its maximum capacity, but air gaps 152a, 152b of any size is within the scope of the present invention.

The shifting of the fuel in the fuel tank 14 when the forced-air heater 110 is transitioned from the intended firing orientation to the substantially-vertical storage orientation creates a vacuum at the fuel outlet 154. The vacuum results in the siphoning of fuel from the hose 158 back into the fuel tank 114 instead of allowing the fuel to leak from the nozzle 160. Additionally, most, if not all of the remaining fuel not siphoned back into the fuel tank 114 is allowed to pool in the return curve 162 in the hose 158 instead of draining from the nozzle 160. This further minimizes leakage of the fuel from the forced-air heater 110.

Although much of the description above focuses on portable forced-air heaters, fixed heating installations such as furnaces are also within the scope of the present invention.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

The invention claimed is:

1. A forced-air heater comprising:
   a self-contained on-board electric-power supply that allows the forced-air heater to operate without an external electric power source;
   a fuel tank;
   a combustion chamber;
   a support;
   a housing including upper and lower housing portions;
   a motorized fan that during operation draws in ambient air through an air intake and forces air into the combustion chamber; and
   an electric energy outlet adapted to interface with an external electric accessory to energize the external electric accessory with electric power from said self-contained on-board electric-power supply.

2. The forced-air heater of claim 1, further comprising:
   a rectifier to distribute direct current electric energy to the heater.

3. The forced-air heater of claim 1, further comprising:
   an inverter to distribute alternating current electric energy to the heater.

4. The forced-air heater of claim 1, further comprising:
   a control unit to establish and break conductive pathways to activate and deactivate electric components.

5. The forced-air heater of claim 1, further comprising:
   at least one light source coupled to the heater.

6. The forced-air heater of claim 1, further comprising:
   a heater control panel operatively coupled with an ignition switch and a thermostat interface adapted to allow an operator to control a thermostat.

7. The forced-air heater of claim 1, further comprising:
   a rain shield distinct from said housing adapted to interfere with the entry of falling objects or other debris into an end of an elongated heating conduit while the elongated heating conduit is in a substantially vertical position.

8. The forced-air heater of claim 1, wherein the on-board electric-power supply is selected from the group consisting of a thermoelectric generator, a fuel cell, and an ultracapacitor.

9. The forced-air heater of claim 1, wherein the on-board electric-power supply is a lithium secondary cell battery or lithium ion battery.

10. A forced-air heater comprising:
    a self-contained on-board electric-power supply that is a lithium secondary cell battery or lithium ion battery that allows the forced-air heater to operate without an external electric power source;
    a fuel tank;
    a combustion chamber;
    a support;
    a housing; and
    a motorized fan that during operation draws in ambient air through an intake and forces air into the combustion chamber, and
    an electric energy outlet adapted to interface with an external electric accessory to energize the external electric accessory with electric power from said self-contained on-board electric-power supply.

11. The forced-air heater of claim 10, further comprising:
    an electric energy outlet that interfaces with an electric accessory to energize the electric accessory.

12. The forced-air heater of claim 10, wherein the on-board electric power supply has a charge capacity per unit area of positive and negative electrodes of at least 0.75 mA-h/cm2.

13. The forced-air heater of claim 10, wherein the on-board electric power supply has a specific impedance of less than about 16 Ω-cm2.

14. The forced-air heater of claim 10, further comprising:
    a negative electrode of the on-board electric power supply having a specific impedance of less than or equal to about 2.5 Ω-cm2.

15. The forced-air heater of claim 10, further comprising:
    a chassis that enables mobility;
    at least one wheel positioned within a wheel well formed in the fuel tank; and
    a frame having a cross member that can serve as a handle which allows an operator to grasp the forced-air heater and maneuver it.

* * * * *